(12) United States Patent
Aldrich

(10) Patent No.: US 11,796,294 B2
(45) Date of Patent: Oct. 24, 2023

(54) PRECISION DECIMAL INCH TAPE MEASURE

(71) Applicant: Charles Aldrich, Clarion, IA (US)

(72) Inventor: Charles Aldrich, Clarion, IA (US)

( * ) Notice: Subject to any disclaimer, the term of this patent is extended or adjusted under 35 U.S.C. 154(b) by 0 days.

(21) Appl. No.: 17/504,981

(22) Filed: Oct. 19, 2021

(65) Prior Publication Data

US 2023/0122542 A1    Apr. 20, 2023

(51) Int. Cl.
*G01B 3/1056* (2020.01)
*G01B 3/00* (2006.01)

(52) U.S. Cl.
CPC ........... *G01B 3/1056* (2013.01); *G01B 3/006* (2013.01)

(58) Field of Classification Search
CPC ............................. G01B 3/1056; G01B 3/006
See application file for complete search history.

(56) References Cited

U.S. PATENT DOCUMENTS

| | | | | |
|---|---|---|---|---|
| 3,484,042 A * | 12/1969 | Hoffmeister | ............. | G06G 1/00 235/71 R |
| 4,149,320 A * | 4/1979 | Troyer | ................. | G01B 3/1004 33/758 |
| 4,247,986 A * | 2/1981 | Burroughs | ............. | G01B 3/006 33/494 |
| 4,551,847 A * | 11/1985 | Caldwell | ................ | G01D 5/363 377/24 |
| 4,696,110 A * | 9/1987 | Walker | .................... | G01B 3/004 33/759 |
| 4,811,489 A * | 3/1989 | Walker | .................... | G01B 3/004 33/476 |
| 5,433,014 A * | 7/1995 | Falk | ........................ | G01D 5/347 455/67.11 |
| 5,746,001 A * | 5/1998 | Fisher | .................... | G09B 23/02 33/484 |
| 6,962,002 B2 * | 11/2005 | Panosian | ............. | G01B 3/1084 33/760 |
| 9,212,882 B2 * | 12/2015 | Brossard | ................ | G01B 3/004 |
| 9,823,055 B2 * | 11/2017 | Cromwell | ............ | G01B 3/1003 |
| 10,082,379 B2 * | 9/2018 | Kim | ....................... | G01B 3/1056 |
| 10,228,227 B2 * | 3/2019 | Kawashima | ............. | G01B 3/02 |
| 10,859,363 B2 * | 12/2020 | Murray | .................. | G01D 5/262 |
| 11,415,402 B2 * | 8/2022 | Koike | ................... | G01B 3/1007 |

(Continued)

*Primary Examiner* — Yaritza Guadalupe-McCall
(74) *Attorney, Agent, or Firm* — Mark David Torche; Patwrite Law

(57) ABSTRACT

A precision decimal inch tape measure has a housing that holds a retractable measurement tape. The retractable measurement tape has a hook on an end. The retractable measurement tape has an upper measurement scale defined along an upper portion of the retractable measurement tape and a lower measurement scale defined along a lower portion of the retractable measurement tape. Both the upper measurement scale and the lower measurement scale indicate inches divided into decimal divisions. The upper measurement scale includes a cumulative foot indicia and the lower measurement scale includes a cumulative inch indicia. The cumulative foot indicia is indicated in red and the cumulative inch indicia is indicated in black. The precision decimal inch tape measure is designed to work with drawings produced in decimal inches as is the preferred standard of CAD drawings. This instant invention works with cumulative feet and inches or with cumulative inches.

5 Claims, 4 Drawing Sheets

(56) References Cited

U.S. PATENT DOCUMENTS

| | | | | |
|---|---|---|---|---|
| 2004/0035012 A1* | 2/2004 | Moehnke | ............. | G01B 3/1003 |
| | | | | 33/494 |
| 2004/0055174 A1* | 3/2004 | Hirsch, Jr. | ........... | G01B 3/1003 |
| | | | | 33/759 |
| 2005/0155245 A1* | 7/2005 | Panosian | .............. | G01B 3/1084 |
| | | | | 33/760 |
| 2006/0143934 A1* | 7/2006 | Perry | .................... | G09B 23/04 |
| | | | | 33/494 |
| 2007/0054247 A1* | 3/2007 | Castruita | ............... | G09B 23/04 |
| | | | | 434/196 |
| 2008/0261184 A1* | 10/2008 | Eras | ........................ | G01B 3/06 |
| | | | | 33/494 |
| 2010/0275456 A1* | 11/2010 | Lord | ....................... | G01D 7/00 |
| | | | | 33/763 |
| 2013/0014400 A1* | 1/2013 | Kucik | ................. | G01B 3/1003 |
| | | | | 33/759 |
| 2015/0082644 A1* | 3/2015 | Cromwell | ............. | G01B 3/006 |
| | | | | 33/492 |
| 2015/0168119 A1* | 6/2015 | French | ................ | G01B 3/1003 |
| | | | | 33/494 |
| 2015/0268024 A1* | 9/2015 | Brossard | ............. | G01B 3/1056 |
| | | | | 33/760 |
| 2016/0178338 A1* | 6/2016 | Webb | ................. | E04F 21/0076 |
| | | | | 33/760 |
| 2017/0205218 A1* | 7/2017 | Kim | .................... | G01B 3/1041 |
| 2018/0172414 A1* | 6/2018 | Kawashima | ............. | G01B 3/02 |
| 2019/0094001 A1* | 3/2019 | Murray | ................ | G01B 3/1084 |
| 2020/0208954 A1* | 7/2020 | Koike | ................. | G01B 3/1043 |

\* cited by examiner

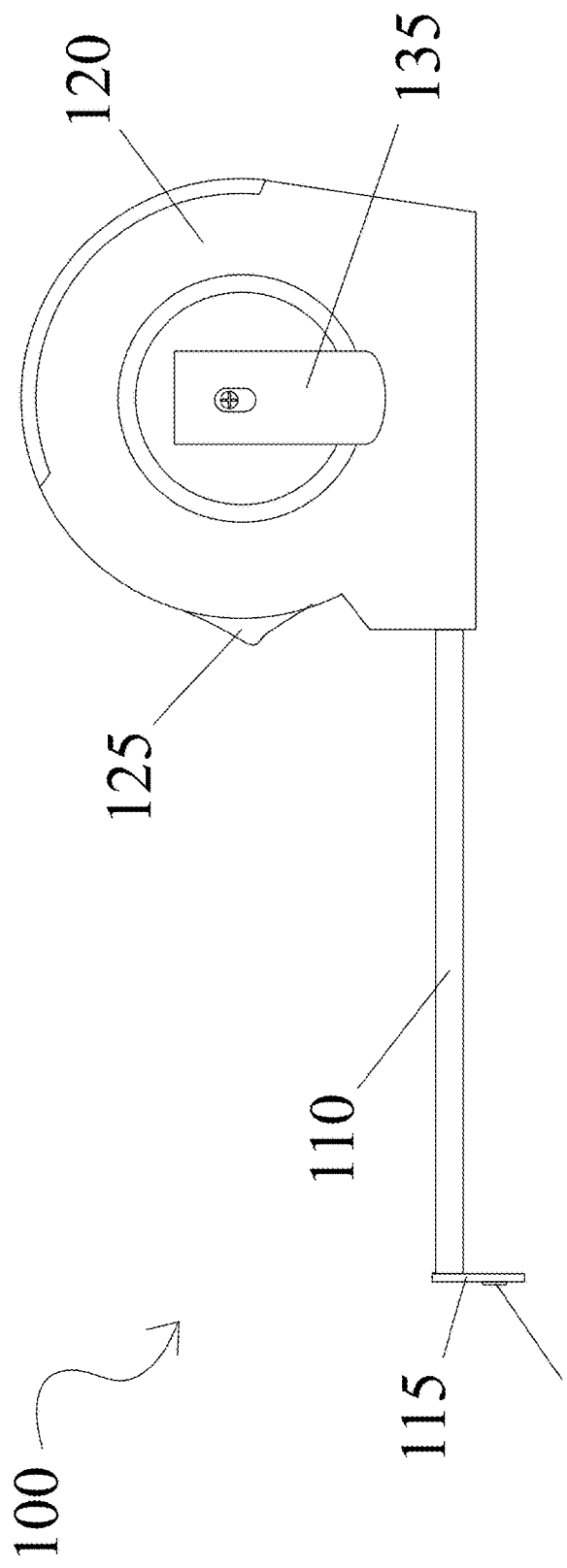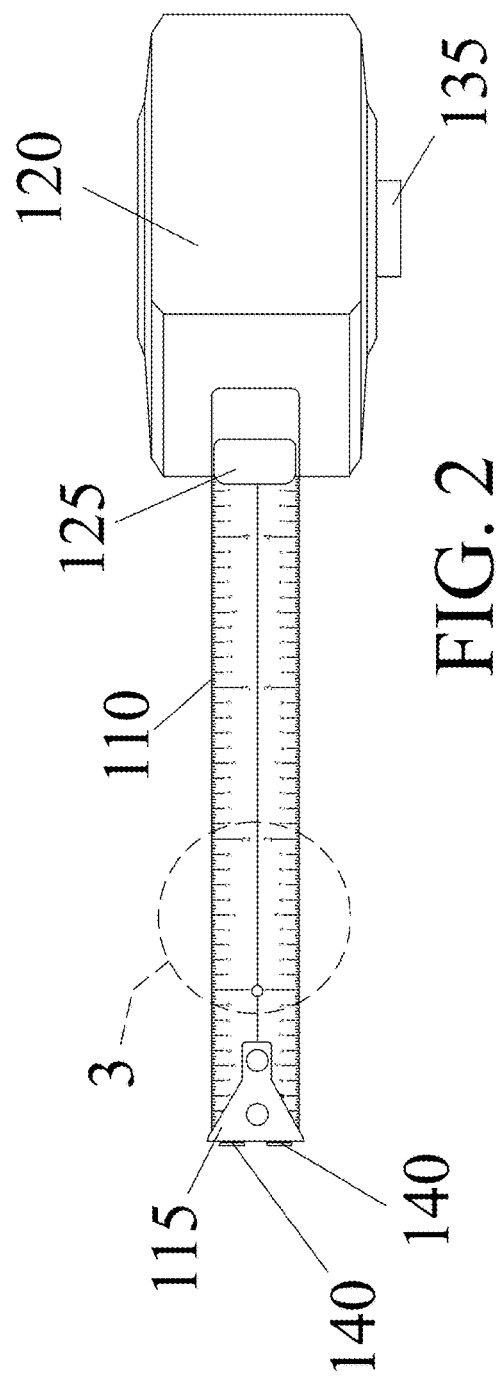

PRECISION DECIMAL INCH TAPE MEASURE

BACKGROUND OF THE INVENTION

The need for measurement is ancient as is apparent since many of the terms such as foot, hand and pace, etc. are named with reference to human experience. Of course each profession has specialized measurement needs and many different standards were created to fill those needs. It wasn't until the 18th century before any serious attempt was made for more universal standards.

One of the earliest measurement of length was known as the cubit and was defined as the distance from the elbow to the tip of the middle finger. As the need for more precise measurements increased, other units were derived such as feet and inches. Although this was an improvement, it resulted in complicated relationships between the units. The Romans divided the foot into 12 inches and also gave us the mile.

The counting system based on 10 (decimal) has many advantages, but it is not the system of measurement adopted by the United States during its formation. Even today with the widespread acceptance of the metric system, many measurements in the United States are still made in the US Customary and Imperial Systems that utilize yards, feet and inches to describe lengths. A system of measurement that is often used in today's engineering is known as the decimal inch which retains the standard inch as the unit but divides the inch by 10 ths which is often preferred over dealing with fractions especially with modern CAD and other machine interfacing measurements.

Tape measures are useful in many ways as they allow the user to conveniently handle both short and long measurements since the tape is rolled and contained within a housing. Tape measures typically sold in the US come in United States customary units in feet and inches, metric units meters, centimeter and millimeters. Some tape measures include both by having US customary on one side and metric on the other. In order to bridge the gap between using the US system and decimals, many users rely on conversion tables that convert between fractions and the decimal equivalents. There is a need for a tape measure that allows a user to directly read decimal inches without the need to convert the measurement.

SUMMARY OF THE INVENTION

A precision decimal inch tape measure has a housing that holds a retractable measurement tape. The retractable measurement tape has a hook on an end. The retractable measurement tape has an upper measurement scale defined along an upper portion of the retractable measurement tape and a lower measurement scale defined along a lower portion of the retractable measurement tape. Both the upper measurement scale and the lower measurement scale indicate inches divided into decimal divisions. The upper measurement scale includes a cumulative foot indicia and the lower measurement scale includes a cumulative inch indicia. The cumulative foot indicia is indicated in red and the cumulative inch indicia is indicated in black. The precision decimal inch tape measure is designed to work with drawings produced in decimal inches as is the preferred standard of CAD drawings. This instant invention works with cumulative feet and inches or with cumulative inches.

Other features and advantages of the instant invention will become apparent from the following description of the invention which refers to the accompanying drawings.

BRIEF DESCRIPTION OF THE DRAWINGS

FIG. 1 is a side view of a precision decimal inch tape measure according to an embodiment of the invention.
FIG. 2 is a top view of the precision decimal inch tape measure shown in FIG. 1.

DETAILED DESCRIPTION OF THE INVENTION

Figure 3:
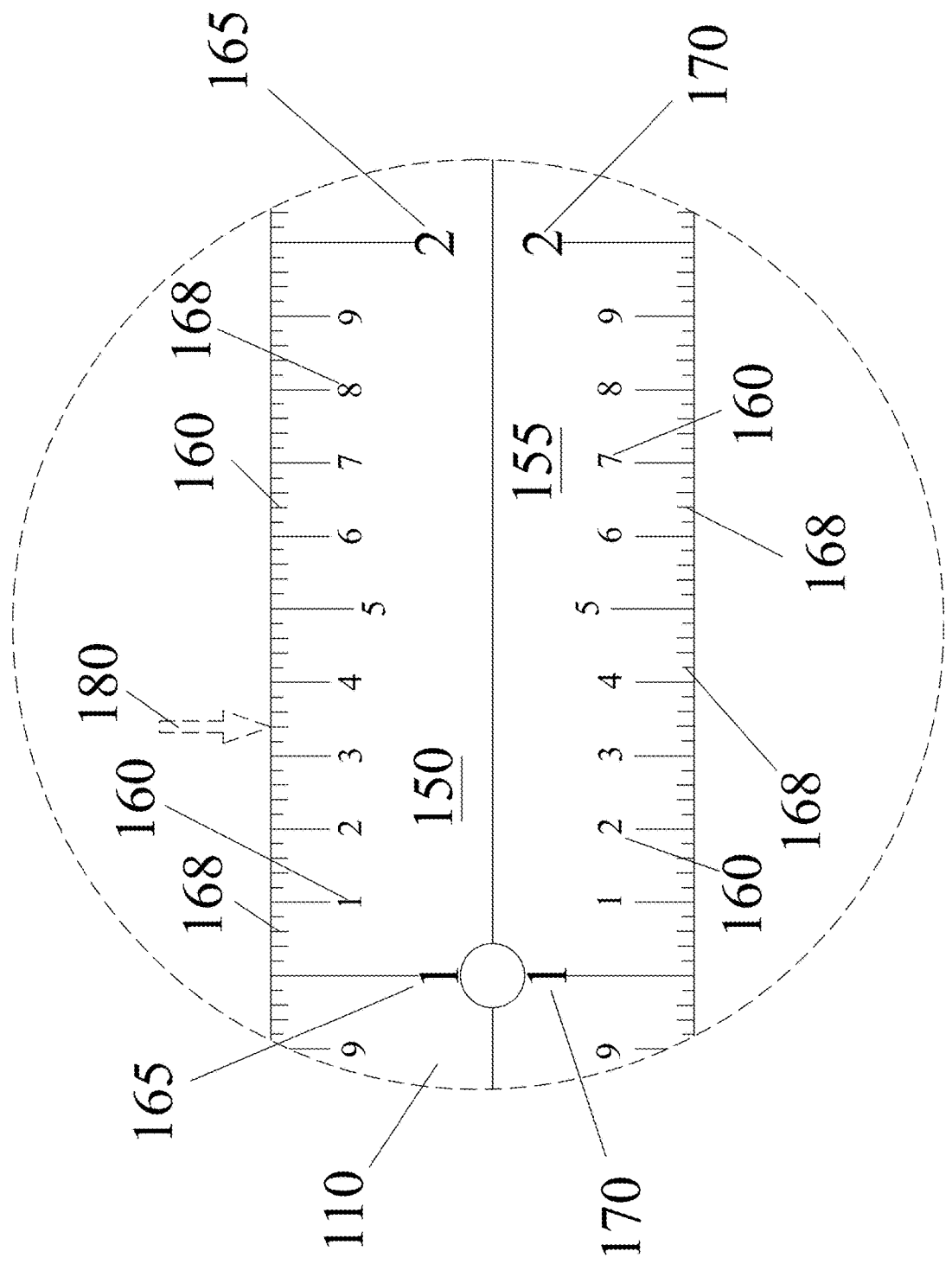
FIG. 3 is a close-up view of the portion shown in FIG. 2.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to FIGS. 1 and 2, a precision decimal inch tape measure 100 is shown having a retractable measuring tape 110 that is woundably contained within a housing 120. Retractable measuring tape 110 has a hook member 115 at an end and at least one magnet 140 to aid in stability when measuring as is known in the art. Also provided is a clip 135 and a tape lock 125 as is known in the art. Retractability is provided using a retracting mechanism (not shown) as is known in the art.

Referring now to FIGS. 2 and 3, a close-up view of a portion of retractable measuring tape 110 is shown having an upper measurement scale 150 and a lower measurement scale 155. As can be seen, the standard inch is divided into 10 segments 160 to represent decimal inch divisions. Further divisions 168 are also decimal representations. As an example, a measurement 180 is shown as reading 1.34 inches read directly from upper measurement scale 150. Of course other decimal divisions may be provided if increased precision is desired.

Figure 4:
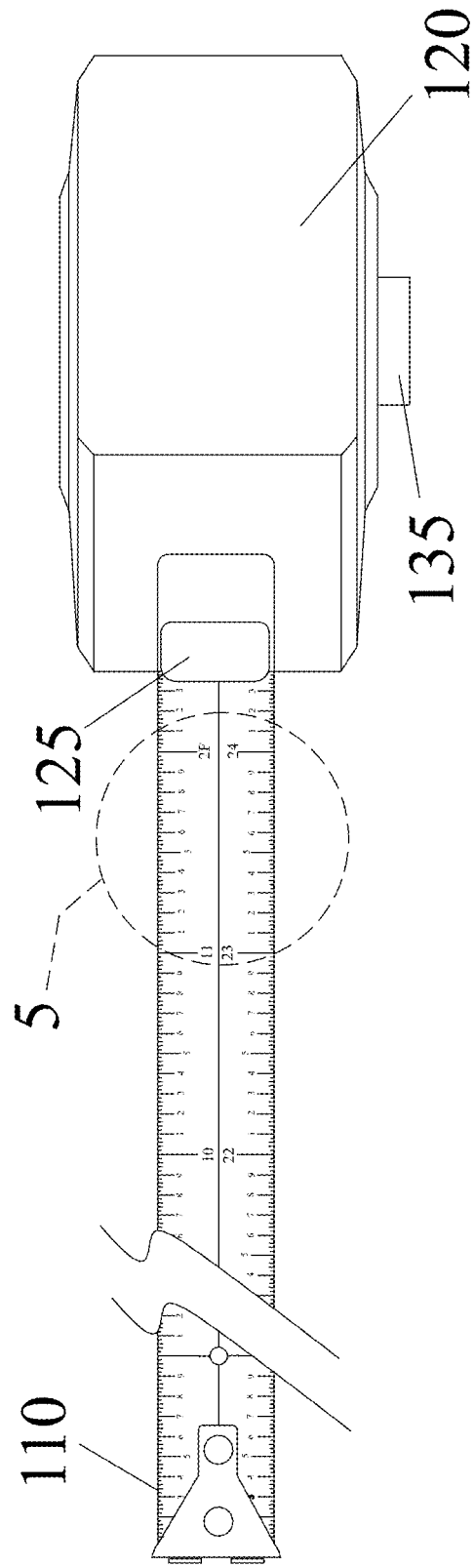
FIG. 4 is a top view of an extended portion of the precision decimal inch tape measure shown in FIG. 1.
Figure 5:
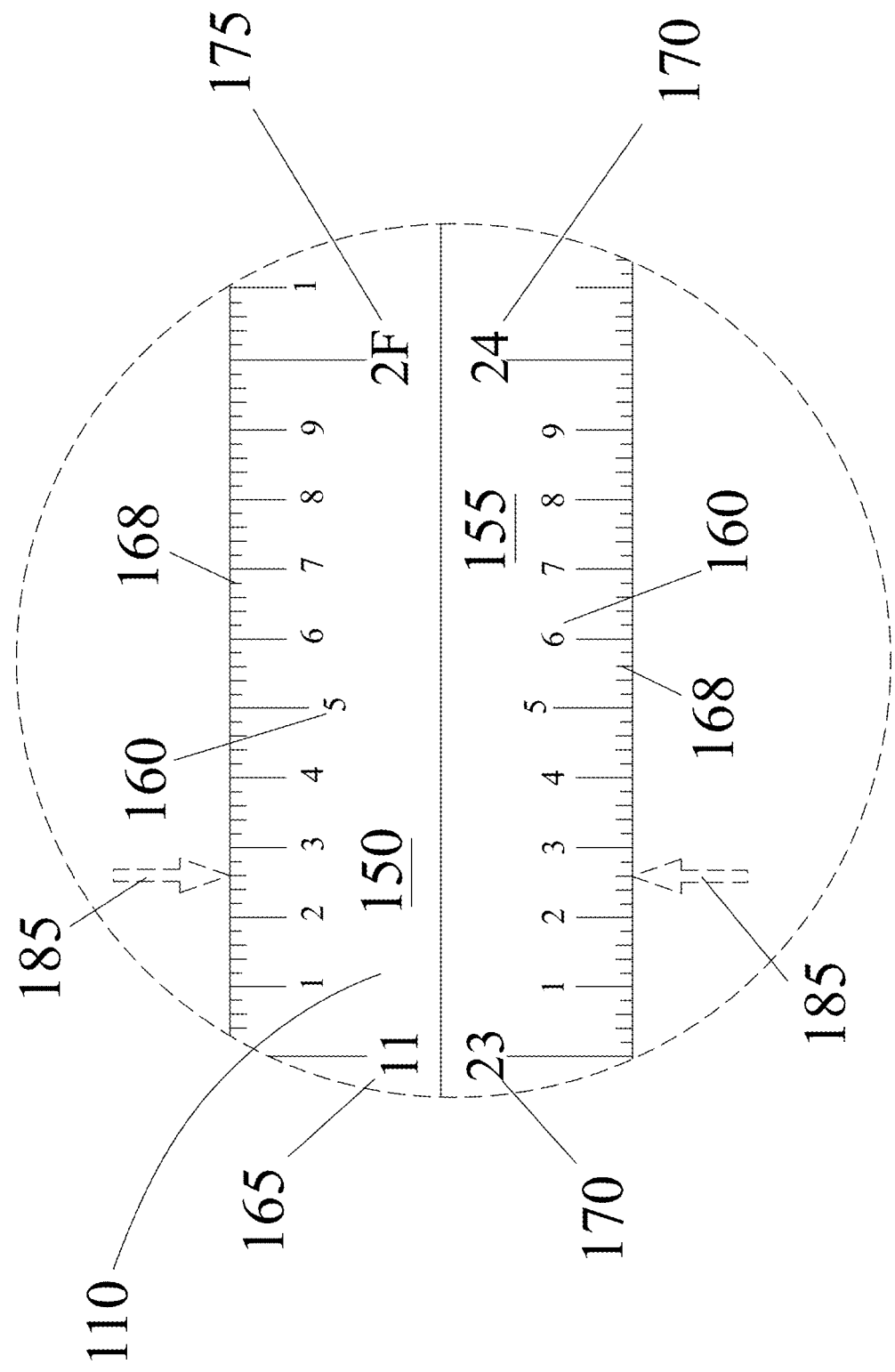
FIG. 5 is a close-up view of the portion shown in FIG. 4.

Now referring to FIGS. 4 and 5, a close-up view of an extended portion of retractable measuring tape 110 is shown with an inch indicia 165 and a cumulative foot indicia 175 on upper measurement scale 150 and a cumulative inch indicia 170 shown on lower measurement scale 155. As an example of how this is used, another measurement 185 is read as 1 foot 11.26 inches on upper measurement scale 150 and as 23.26 inches on lower measurement scale 155. In this way, the traditional fractional lengths such as ⅛, 5/16, etc. are not used and the user directly reads the decimal inch measurements. This allows the user to directly use CAD drawings and other blueprints, mechanical drawings, etc. that follow the CAD preferred standard using decimal inches rather than the traditional fractions associated with the US customary system and without referring to a conversion chart or computer app.

Also, since the mathematics is easier using decimal divisions, there is less room for user error in calculating what each division line means as is necessary with the standard designations such as ⅛ inch divisions, etc.

Although not shown, Upper measurement scale 150 may be marked in a different color from the marking shown on lower measurement scale 155. For example, inch indicia 165 may be printed in red on upper measurement scale 150 and cumulative inch indicia 170 may be printed in black on lower measurement scale 155 to aid in readability and to reduce errors. Additionally, precision is improved with decimal divisions since tenths of an inch is more precise than ⅛ths of an inch or similarly, hundredths of an inch is more precise than 64 ths of an inch, etc. Also, when calculating angles, inches need to be in decimal form which under the prior art had to be converted with the aid of a conversion chart or table. The present invention eliminates the need for conversion as the decimal inches are read directly.

As is known in the art, housing 120 may be made of metal, plastic or other suitable material along with clip 135 and tape lock 125. Retractable measuring tape 110 is generally made of flexible steel and channel shaped to provide stiffness when unrolled and to return to rolled shape when retracted as is known in the art. Of course other materials may be used.

Although the instant invention has been described in relation to particular embodiments thereof, many other variations and modifications and other uses will become apparent to those skilled in the art.

What is claimed is:

1. A precision decimal inch tape measure to allow the transfer of measurements from a decimal inch scale drawing without conversion comprising:
   a housing;
   said housing holding a retractable measurement tape;
   a hook member attached to a free end of said retractable measurement tape;
   an upper measurement scale defined along an upper portion of said retractable measurement tape wherein said upper measurement scale indicates inches divided into upper decimal divisions wherein said upper decimal divisions directly correspond to measurements shown on a decimal inch scale drawing;
   a lower measurement scale defined along a lower portion of said retractable measurement tape wherein said lower measurement scale indicates inches divided into lower decimal divisions wherein said lower decimal divisions directly correspond to said measurements shown on said decimal inch scale drawing;
   a cumulative foot indicia disposed on said upper measurement scale;
   wherein said cumulative foot indicia is printed in a first color and
   wherein a user directly reads and transfers a scale measurement from said decimal inch scale drawing using said upper measurement scale and/or said lower measurement scale to a selected material without the need to use a conversion process, thus reducing error conversion errors.

2. The precision decimal inch tape measure of claim 1 wherein said lower measurement scale has a cumulative inch indicia.

3. The precision decimal inch tape measure of claim 2 wherein said cumulative inch indicia appears in a second color.

4. The precision decimal inch tape measure of claim 3 wherein said first color is red and said second color is black.

5. A method of using a precision decimal inch tape measure to transfer measurements from a decimal scale inch drawing without using a conversion process comprising the steps of:
   obtaining a precision decimal inch tape measure;
      said precision decimal inch tape measure comprising;
         a housing;
         said housing holding a retractable measurement tape;
         a hook member attached to a free end of said retractable measurement tape;
         an upper measurement scale defined along an upper portion of said retractable measurement tape wherein said upper measurement scale indicates inches divided into decimal divisions;
         a lower measurement scale defined along a lower portion of said retractable measurement tape wherein said lower measurement scale indicates inches divided into decimal divisions;
         a cumulative foot indicia disposed on said upper measurement scale; and
         wherein said cumulative foot indicia is printed in a first color;
   reading a decimal inch measurement from a scale decimal inch drawing; and
   using said precision decimal inch tape measure to transfer said decimal inch measurement to a selected object directly wherein said measurement is indicated without the need for a conversion process.

* * * * *